United States Patent
Fares et al.

(10) Patent No.: US 9,481,604 B2
(45) Date of Patent: *Nov. 1, 2016

(54) SUPPLEMENTARY CEMENTITIOUS MATERIAL AND METHOD FOR DISPOSING OF ELECTRIC-ARC FURNACE DUST (EAFD)

(71) Applicant: King Saud University, Riyadh (SA)

(72) Inventors: Galal Fares, Riyadh (SA); Rajeh Z. Al-Zaid, Riyadh (SA); Abdulrahman M. Alhozaimy, Riyadh (SA); Abdulaziz I. Al-Negheimish, Riyadh (SA); Mohammad I. Khan, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,914

(22) Filed: Mar. 27, 2015

(65) Prior Publication Data
US 2015/0197449 A1 Jul. 16, 2015

Related U.S. Application Data

(62) Division of application No. 13/719,565, filed on Dec. 19, 2012, now Pat. No. 9,187,371.

(51) Int. Cl.
*C04B 28/02* (2006.01)
*C04B 18/04* (2006.01)
*C04B 18/14* (2006.01)
*C04B 28/04* (2006.01)

(52) U.S. Cl.
CPC .......... *C04B 28/021* (2013.01); *C04B 18/0481* (2013.01); *C04B 18/149* (2013.01); *C04B 28/02* (2013.01); *C04B 28/04* (2013.01); *Y02W 30/94* (2015.05)

(58) Field of Classification Search
CPC .......................... C04B 33/138; C04B 18/105
See application file for complete search history.

(56) References Cited

U.S. PATENT DOCUMENTS

| | | |
|---|---|---|
| 5,557,031 A | 9/1996 | Al-Sugair et al. |
| 5,569,152 A | 10/1996 | Smith |
| 5,672,146 A | 9/1997 | Aota |
| 5,853,474 A | 12/1998 | Hilton |
| 6,200,381 B1 | 3/2001 | Rechichi |
| 7,585,270 B2 | 9/2009 | Doumbos et al. |
| 8,152,917 B2 | 4/2012 | Al-Negheimish et al. |

*Primary Examiner* — Jun Li
*Assistant Examiner* — Karam Hijji
(74) *Attorney, Agent, or Firm* — Hauptman Ham, LLP

(57) ABSTRACT

The present invention contemplates a cementitious additive that contains electric-arc furnace dust (EAFD) and a precursor as a replacement for up to about 30% of the cement in concrete. The additive includes about 50% by weight EAFD and about 50 wgt. % of precursor. The precursor includes about 55 wgt. % silica, about 10 to 20 wgt. % lime, about 2 to 5 wgt. % soda, about 5 to 15 wgt. % potash, about 2 to 6 wgt. % alumina and about 1 to 3 wgt. % magnesia. The method also contemplates the step of homogenizing the electric-arc furnace dust (EAFD) and precursor to produce engineered dust (ED) and then replacing up to 30% of the cement with a mixture referred to as ED i.e. homogenized EAFD and precursor.

11 Claims, 5 Drawing Sheets

Effect of ED replacement levels on setting time of mortar mixes

Effect of ED replacement levels on setting time of mortar mixes

Compressive strength development with the addition of ED at 3 and 7 days

XRD patterns of ED

SEM microstructrural analysis of ED

Compressive strength of 5% ED, MS and FA with W/B of 0.3 and S/B of 1.5

Compressive strength of 5% ED, MS and FA with W/B of 0.4 and S/B of 1.5

Compressive strength of 5% ED, MS and FA with W/B of 0.5 and S/B of 2

Compressive strength of 10% ED, MS and FA with W/B of 0.4 and S/B of 1.5

Compressive strength of 10% ED, MS and FA with W/B of 0.5 and S/B of 2

SUPPLEMENTARY CEMENTITIOUS MATERIAL AND METHOD FOR DISPOSING OF ELECTRIC-ARC FURNACE DUST (EAFD)

CROSS REFERENCE TO RELATED APPLICATIONS

The present application is a Divisional of U.S. patent application Ser. No. 13/719,565, filed Dec. 19, 2012, the disclosure of which is herein incorporated by reference in its entirety.

FIELD OF THE INVENTION

This invention relates to a supplementary cementitious material and method for disposing of relatively large quantities of hazardous waste and more particularly to a concrete composition and method for disposing of relatively large amounts of electric-arc furnace dust (EAFD).

BACKGROUND FOR THE INVENTION

Electric-arc furnace dust (EAFD) is a waste by product material generated during steel making processes using EAF technology. 15-20 kg of the dust is generated per ton of steel product. The world generation of EAFD is estimated to be around 3.7 million tons per year. Further, with the continued increase in using EAF technology in worldwide steel production during the last decade, the problem of managing and handling EAFD is also increasing.

EAFD is collected in bag houses and it comes in the form of very fine powder. The chemical composition of EAFD varies according to the quality of steel scrap used in the manufacturing process. It is documented that the prevailing elements in the EAFD vary in concentration. However, the major elements found in EAFD are oxides of zinc and iron.

Concentration ranges of elements in EAFD are as follows:

| Element | Range (%) |
| --- | --- |
| Zn | 2-46 |
| Fe | 10-45 |
| Ca | 1-25 |
| Si | 1-5 |
| Al | 0.1-1.5 |
| Mg | 1-12 |
| Na | 0.5-1.8 |
| K | 0.35-2.30 |
| Cd | ?? |
| Pb | ?? |

Two forms of particles are observed in EAFD using scanning electron microscope (SEM). The predominant spherical forms observed in EAFD were identified to include a mix of metal oxides (Fe, Zn, Mn, $OFe_2$, $O_3$). The minor angular-shaped particles were considered to be zincite (ZnO).

The x-ray diffraction (XRD) analysis of EAFD powder have shown the presence of magnetite ($Fe_2O_3$), Franklinite ($ZnFe_2O_4$), lime and zinc oxide (ZnO).

The mineralogical composition of EAFD shows that magnetite, lime, franklinite and zincite represent the major phases while magnezite, sylvite and hematite represent the minor ones.

One of the major problems encountered in the steel industry throughout the world is the management of the EAFDs which is listed as a hazardous waste by regulations in most developed countries. This listing is to a large extent due to the presence of leachable heavy metals. As such it cannot be disposed of directly as a landfill. Consequently, the problems associated with disposing of EAFD are sizable and costly.

Several routes for disposing of EAFD have been proposed in the literature. They include solidification/stabilization (S/S) technologies, recovery of zinc and lead and recycling and utilization of EAFD in cement and concrete manufacturing.

Even though S/S technologies that can be used to treat EAFD are improving they are the least desirable approach to manage the EAFD disposable because they offer no other benefits to the industry. The recovery method of zinc and lead have been developed and successfully applied especially to the EAFD that contain high percentages of zinc and lead. In some cases, this approach is not economically feasible, but still being used because it is the only viable option to manage the dust.

The concrete industry is one of the potential and energetic solutions used to consume waste materials. Accordingly, many researchers have investigated the incorporation of EAFD in concrete. It was observed that the concrete containing EAFD presented better mechanical behavior and improved durability performance when compared to a reference concrete mixture. However, the use of EAFD in concrete profoundly prolongs the setting time of concrete for up to 30 hours at low replacement levels of EAFD (less than 3%). This undesirable effect is considered as the main drawback of wider utilization of EAFD in concrete. The retardation of the setting time is attributed to the presence of heavy metals such as zinc and lead as they are present in a soluble form in their carrying minerals.

The current invention is proposed to eliminate the problem with extended setting time associated with the use of EAFD. This limits its use in concrete in a very small amount. This is achieved by bonding the heavy metals in EAFD in an insoluble crystalline phase with inherited cementitious properties. As a result, the detrimental effect of zinc and other heavy metals on setting time is eliminated. Thus, higher amounts of EAFD can be utilized in concrete without negatively affecting the fresh properties.

There are two prior art patents awarded to inventors at the King Saud University in Riyadh, Saudi Arabia. The first discloses the use of electric-arc furnace by product in concrete awarded to the following inventors, Faisal H. Al-Sugair; Abdulaziz I. Al-Negheimish; and Rajeh Z. Al-Zaid. As disclosed in that U.S. Pat. No. 5,557,031, an improved concrete or mortar material wherein cement is replaced by electric-arc furnace dust by amounts of from 0+% to 4% or more based on the amount of cement by weight. In addition, the electric-arc furnace dust can be used as an additive to obtain the same effect.

A more recent U.S. Pat. No. 8,152,917 of Abdulaziz I. Al-Negheimish; Rajeh Z. Al-Zaid and Abdulrahman M. Alhozaimy discloses a method for manufacturing concrete bodies or forms containing electric-arc furnace dust in the amount of up to about 4% at elevated temperatures to provide concrete bodies. The concrete bodies have improved compressive strength and slump retention capability. The method for producing the bodies includes the step of producing pre-selected amounts of electric-arc furnace dust, water, cement and aggregate. The electric-arc furnace dust is mixed with water and then added to the cement and aggregate and mixed together at a temperature of about 32° C. and 45° C. to form a hot mixture. The hot mixture is added to a mold and caste at an elevated temperature to form a body with improved strength and slump retention characteristics.

BRIEF SUMMARY OF THE INVENTION

In essence, the present invention contemplates a cementitious additive that contains electric-arc furnace dust (EAFD) and a precursor as a replacement for up to 30 wgt. % of the cement in concrete. The additive includes about 50 wgt. % EAFD and about 50 wgt. % of a precursor. The precursor includes at least about 55 wgt. % silica, at least about 10 to 20 wgt. % lime, about 2 to 5 wgt. % soda, about 5 to 15 wgt. % potash, about 2 to 6 wgt. % alumina and about 1 to 3 wgt. % magnesia.

In addition, a homogenuous mix of the EAFD and precursor are fed into a kiln at about 1,000° C. and maintained therein at about that temperature for about 25 to 35 minutes for recrystallization to thereby form a new insoluble phase of zinc and other heavy elements such as lead that are chemically bonded.

A second embodiment of the invention contemplates a method for replacing up to 30% of the cement in a concrete mix without adversely effecting the setting time and the mechanical properties by adding the mix described in the first embodiment of the invention to a concrete formulation that typically includes fine and coarse aggregate and water.

A third embodiment of the invention comprises or consists of 50 wgt. % of EAFD and a precursor in an equal amount wherein the precursor comprises or consists of about 65 wgt. % silica, about 10 to 20 wgt. % lime, about 2 to 5 wgt. % soda, about 2 to 6 wgt. % alumina and about 1 to 3 wgt. % magnesia. The EAFD and precursor are homogenized and heated (thermally treated) in a kiln preferably an electric kiln at about 1000° C. for about 25 to 35 minutes.

A fourth embodiment of the invention contemplates a method for disposing of electric-arc furnace dust (EAFD) comprising or consisting of the following steps. In a first step a mixture of EAFD in an amount of about 50 wgt. % and a precursor in an equal amount are provided. The precursor comprises or consists of at least about 55-65 wgt. % silica, about 10 to 20 wgt. % lime, about 2 to 5 wgt. % soda, about 5 to 15 wgt. % potash, about 2 to 6 wgt. % alumina and about 1 to 3 wgt. % magnesia.

In the fourth embodiment of the invention, the EAFD and the precursor are homogenized before feeding to the kiln by grinding one of the EAFD and precursor with the larger particle size to reduce the particle size to same particle size of the other so that each has about the same particle size.

In a further step, the homogenized EAFD and precursor are fed into an electric or fueled kiln at about 1000° C. and processed therein for 25 to 35 minutes to form an insoluble phase of zinc and lead which is referred to as engineered dust (ED). Then about 21 wgt. % of the resulting mixture is mixed with about 49 wgt. % of cement and about 30 wgt. % of coarse and fine aggregate and water to form concrete without adversely effecting the setting times.

A fifth embodiment of the invention relates to a concrete composition comprising and/or consisting of about 70 wgt. % of cement selected from the group consisting of Portland cement, ASTM Type I, Type II, Type V and mixtures thereof; and about 30 wgt. % of thermally treated mix of EAFD and a precursor (an engineered dust). The precursor consists of up to about 65 wgt. % silica, about 15 wgt. % lime, about 3.5 wgt. % soda, about 10.5 wgt. % potash, about 4 wgt. % alumina and about 2 wgt. % magnesia. In addition to the aforementioned base mix, about 70-74 wgt. % of coarse and fine aggregate and water in an amount of about 5 to 8 wgt. % are added.

The invention will now be described in connection with the following figures.

DESCRIPTION OF THE PREFERRED EMBODIMENTS OF THE INVENTION

The present invention is proposed to eliminate a problem associated with including electric arc furnace dust (EAFD) in concrete. The problem with the use of EAFD in concrete is that it significantly prolongs the setting time of the concrete for up to 30 hours at low replacement levels of less than 3% EAFD. This undesirable effect is considered to be the main drawback to the wider utilization of EAFD in concrete. The retardation of the setting time is believed to be due to the presence of heavy metals such as zinc and lead in a soluble form.

The current invention is proposed to eliminate the problem with extended setting time of concrete with EAFD therein and to significantly increase the amounts of EAFD in concrete. This is achieved by bonding the heavy metals in EAFD in an insoluble crystalline phase with cementitious properties leading to what is referred to as engineered dust (ED). As a result the detrimental effect of zinc and other heavy metals on setting times can be eliminated with the potential of added cementitious properties at the hardened state.

In the present invention, a chemo-thermal process transforms a designed mix comprising or consisting of 50% by wgt. EAFD and 50% by wgt. of proprietary precursor into an alternative supplementary cementitious material. In the process the precursor has a lower melting point than that of the EAFD. The output of the process is a material with cementitious properties of zero effect on the setting time. The material is referred to as engineered dust or ED. The ED replacement level can reach up to 30% without a substantial reduction in strength and yet with an overall setting time similar to that shown by a control mixture i.e. equal or less than six hours. It is important to remember that the addition of 3% EAFD prolongs the setting time of concrete for up to 30 hours.

Figure 1:
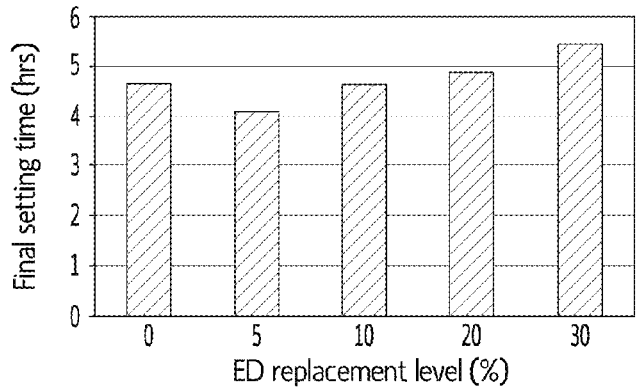
FIG. 1 is a graphical representation illustrating the effect of engineered dust (ED) replacement levels on the setting times of mortar mixes.

FIG. 1 illustrates the effect of engineered dust on the setting time of various mortar mixes containing from 0 to 30% as replacement levels for cement in the mix.

Figure 2:
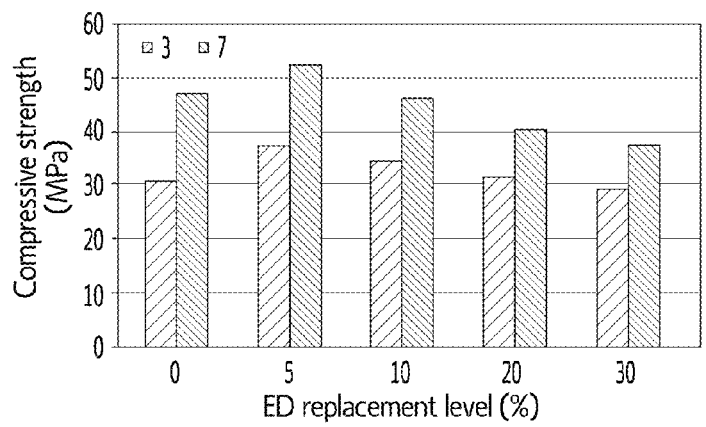
FIG. 2 is a graphical representation illustrating the compressive strength development with the addition of ED at 3 and 7 days.
Figure 6:
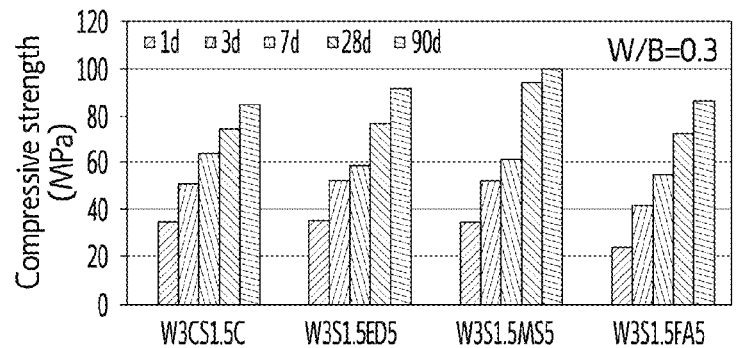
FIG. 6 is a graphical representation illustrating the compressive strength of 5% ED, MS and FA with a water to binder (W/B) ratio of 0.3 and sand to binder (S/B) ratio of 1.5.

The effect of different ED replacement levels of 0.5, 10, 20 and 30% ED on setting times of mortar mixes with water to binder ratios W/B of 0.3 and sand to binder ratios S/B of 1.5 are shown in FIG. 6. The binary mix containing up to 30% ED gives comparable setting times to the control mix. The compressive strength of the mixes at 3 and 7 days is shown in FIG. 2. The binary mix containing 5% represents the optimum mix which gives the highest strength. The binary mix with 10% ED gives comparable results to that given by the control mix while the binary mixes containing 20 and 30% ED gives lower strength than that given by the control mix.

X-Ray Diffraction (XRD) and Scanning Electron Microscope (SEM) Analysis

Figure 3:
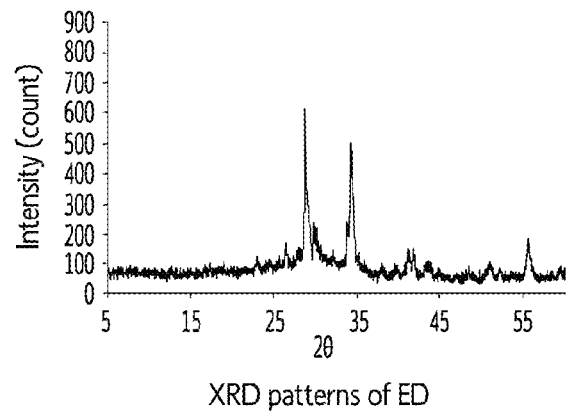
FIG. 3 is a x-ray defraction pattern of ED.

The x-ray diffraction pattern shown in FIG. 3 represents that of the newly formed crystalline phases.

Figure 4:
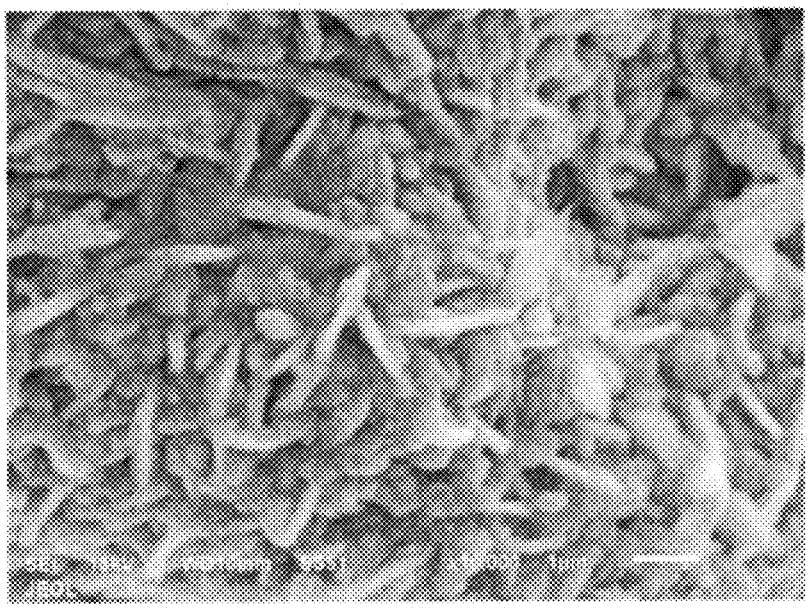
FIG. 4 is a scanning electron microstructural analysis of ED.

The microstructural analysis of ED results in the formation of nano-sized flaky (major) and rectangular (minor) structure as shown in FIG. 4 confirms the presence of the two main phases.

Final Setting Time

Figure 5:
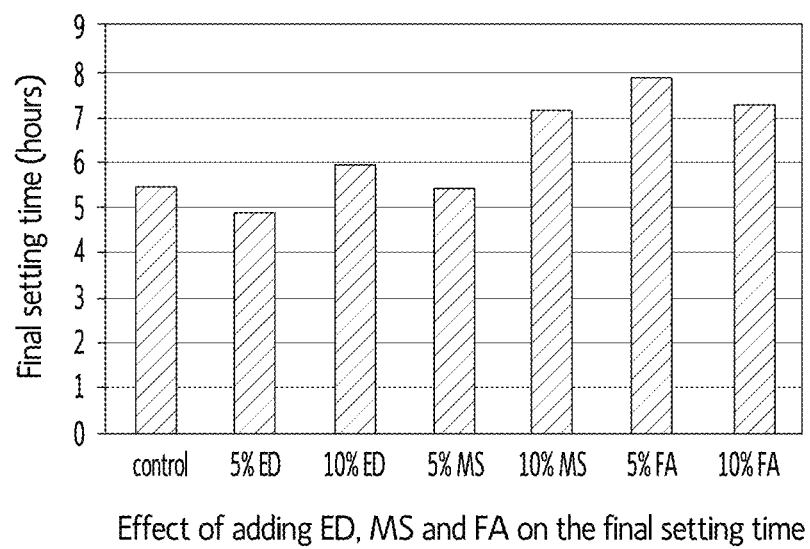
FIG. 5 is a graphical representation illustrating the effect of adding engineered dust (ED), micro silica (MS) and fly ash (FA) on the final setting times.

Different water binary mixes with W/B of 0.5 and S/B of 2 were prepared with 5 and 10% ED, micro silica and fly ash. The final setting time for these binary mixes are shown in FIG. 5. The mortar mix containing 5% ED had a comparable final setting time to that given by a control mix and lower final setting time then that given by both mixes containing 5% MS and 5% FA. Furthermore, the mortar mix containing 10% ED gives lower final setting time then that given by mixes containing 10% MS and 10% FA while still giving a setting time similar to that given by the control mix. Accordingly, it can be concluded that the chemo-thermal process of EAFD has overcome the drawbacks caused by Zn and other heavy metals and has nullified the detrimental effect on setting time.

Compressive Strength

FIG. 1 illustrates the effect of engineered dust on the setting time of various mortar mixes containing from 0 to 30% as replacement levels for cement in the mix. Those mixes are defined and identified in the following table:

Composition of mortar mixtures

| | W/B | S/B | Cement (%) | ED (%) | MS (%) | FA (%) |
|---|---|---|---|---|---|---|
| W3S1.5 | 0.3 | 1.5 | 100 | 0 | 0 | 0 |
| W3S1.5ED5 | 0.3 | 1.5 | 95 | 5 | 0 | 0 |
| W3S1.5MS5 | 0.3 | 1.5 | 95 | 0 | 5 | 0 |
| W3S1.5FA5 | 0.3 | 1.5 | 95 | 0 | 0 | 5 |
| W4S1.5C | 0.4 | 1.5 | 100 | 0 | 0 | 0 |
| W4S1.5ED5 | 0.4 | 1.5 | 95 | 5 | 0 | 0 |
| W4S1.5MS5 | 0.4 | 1.5 | 95 | 0 | 5 | 0 |
| W4S1.5FA5 | 0.4 | 1.5 | 95 | 0 | 0 | 5 |
| W5S2C | 0.5 | 2 | 100 | 0 | 0 | 0 |
| W5S2ED5 | 0.5 | 2 | 95 | 5 | 0 | 0 |
| W5S2MS5 | 0.5 | 2 | 95 | 0 | 5 | 0 |
| W5S2FA5 | 0.5 | 2 | 95 | 0 | 0 | 5 |
| W4S1.5ED10 | 0.4 | 1.5 | 90 | 10 | 0 | 0 |
| W4S1.5MS10 | 0.4 | 1.5 | 90 | 0 | 10 | 0 |
| W4S1.5FA10 | 0.4 | 1.5 | 90 | 0 | 0 | 10 |
| W5S2ED10 | 0.5 | 2 | 90 | 10 | 0 | 0 |
| W5S2MS10 | 0.5 | 2 | 90 | 0 | 10 | 0 |
| W5S2FA10 | 0.5 | 2 | 90 | 0 | 0 | 10 |

Figure 7:
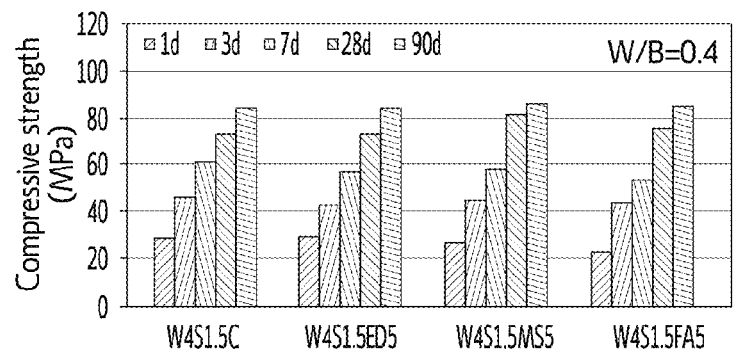
FIG. 7 is a graphical representation illustrating the compressive strength of 5% ED, MS and FA with W/B of 0.4 and S/B of 1.5.
Figure 8:
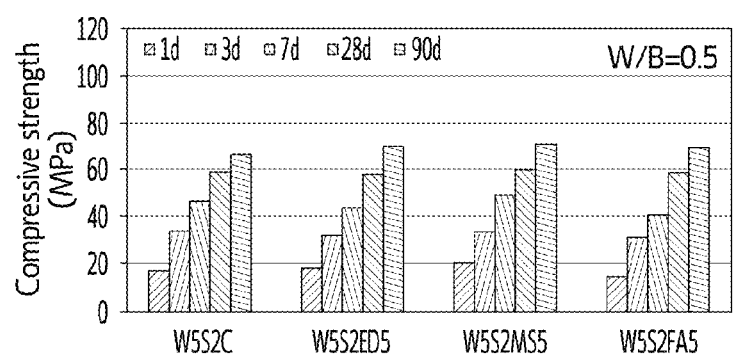
FIG. 8 is a graphical representation illustrating the compressive strength of 5% ED, MS and FA with W/B of 0.5 and S/B of 2.

A comparable study of different mortar binary mixes containing 0, 5 and 10% of ED, micro silica (MS) and fly ash (FA) with water to binder (W/B) ratios of 0.3, 0.4 and 0.5 and sand to binder (S/B) ratios of 1.5 and 2 were carried out as illustrated in FIG. 2. FIG. 6 shows that the addition of 5% ED gives comparable results to that given by 5% MS and 5% FA and again still higher then that of the control mix at W/B ratio of 0.3 and S/B of 1.5. At early and later stages 5% fly ash mix gives lower values then that given by either mixes. FIG. 7 shows that all mixes with W/B ratio of 0.4 and S/B of 1.5 and replacement levels of 5% have similar values at all ages. FIG. 8 shows similar trends i.e., mixes with W/B of 0.5, S/B of 2 and replacement level of 5% have similar values at all ages.

Figure 9:
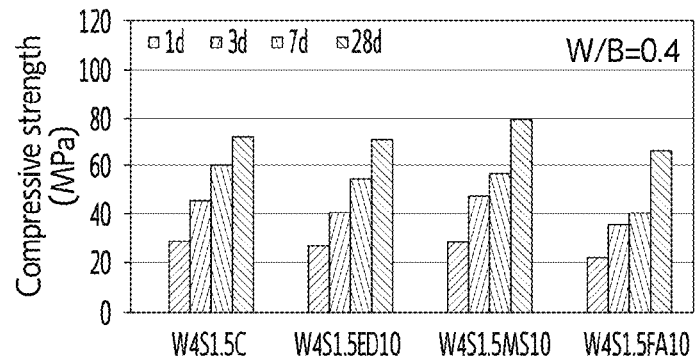
FIG. 9 is a graphical representation illustrating the compressive strength of 10% ED, MS and FA with W/B of 0.4 and S/B of 1.5; and, FIG. 10 is a graphical representation illustrating the compressive strength of 10% ED, MS and FA with W/B of 0.5 and S/B of 2.
Figure 10:
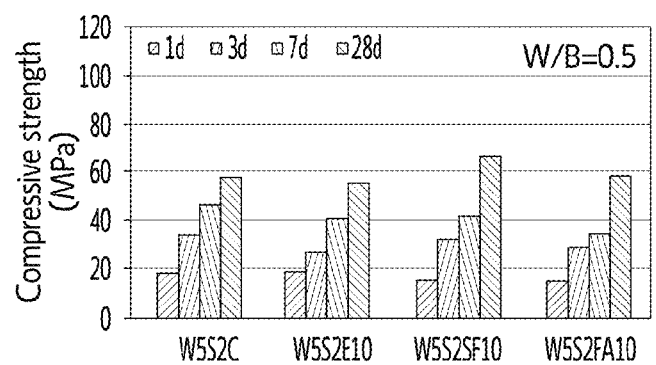

FIG. 9 shows the behavior of the mortar binary mixes with W/B ratio of 0.4, S/B of 1.5 and replacement level of 10%. It shows that the control, 10% ED and 10% FA give comparable results while 10% micro silica gives higher values especially at later ages. FIG. 10 shows the behavior of the mortar binary mixes with W/B ration of 0.5, S/B of 2 and replacement level of 10%. This figure shows that the control and 10% ED gives comparable results while 10% FA and 10% micro silica give higher values especially at later ages. This is attributed to the initial improved apparent workability due to the presence of 10% ED. The insoluble crystalline flaky structure and ED improve the real logical properties of cement by decreasing the friction between the particles through slippery action. Consequently, the incorporation of ED will reduce the water demand and the chemical add mixture content; thus reducing the overall cost of concrete production.

From the above, it is demonstrated that the presence of the engineered EAFD (ED) brings the setting time back to its normal value. With improved cementitious properties enhanced it becomes a more valuable material.

The present invention will now be further illustrated by the following examples.

EXAMPLE 1

A first embodiment of the invention relates to a cementitious additive containing electric-arc furnace dust (EAFD) and a precursor as a replacement for up to 30% of the cement in a concrete mix. The cementitious additive comprises or consists of about 50 wgt. % EAFD and about 50 wgt. % of a precursor and wherein the precursor contains at least about 55 wgt. % silica, at least about 10 to 20 wgt. % lime, about 2 to 5 wgt. % soda, about 5 to 15 wgt. % potash, about 2 to 6 wgt. % alumina and about 1 to 3 wgt. % magnesia and wherein a homogenized mix of the EAFD and precursor is fed into a kiln at about 1000° C. and maintained therein for 25 to 35 minutes for re-crystallization to thereby form a new insoluble phase of zinc and other heavy elements that are chemically bonded.

EXAMPLE 2

In a second example of a cement additive in accordance with the invention, the precursor comprises or consists of about 65 wgt. % silica, about 15 wgt. % lime, about 3.5 wgt. % soda, about 10.5 wgt. % potash, about 4 wgt. % alumina and about 2 wgt. % magnesia.

EXAMPLE 3

A second embodiment of the invention relates to a method for replacing up to 30% of the cement in a concrete mix without adversely effecting the setting time. The method comprises/consists of the following steps: reducing the particle size of the precursor to about the same particle size of the EAFD; homogenizing about 50 wgt. % EAFD and about 50 wgt. % precursor wherein the precursor consists of silica, lime, soda, potash, alumina and magnesia, to produce a homogenized mixture; placing the homogenized mixture in an electric kiln at about 1000° C. for about 25 to 35 minutes for re-crystallization to form an insoluble phase of zinc and heavy metals; and replacing up to 30% of the cement in a concrete mix with said homogenized mixture after the heating of a mix of EAFD and precursor in the kiln step.

EXAMPLE 4

A further example of a method for replacing up to 30% of the cement in a concrete mix without adversely effecting the setting time includes an engineered dust which is composed of a thermally treated mix of 50 wgt. % EAFD and 50 wgt. % precursor wherein the precursor contains about 65 wgt. % silica, about 15 wgt. % lime, about 3.5 wgt. % soda, about 10.5 wgt. % potash, about 4 wgt. % alumina and about 2 wgt. % magnesia.

EXAMPLE 5

A still further example of a method for replacing up to 30% of the cement in a concrete mix without adversely effecting the setting time includes the step of homogenizing the EAFD and the precursor. The step comprises grinding one of the EAFD and the precursor with a larger particle size to approximately the particle size of the other.

EXAMPLE 6

A further example of a method for replacing up to 30% of the cement in a concrete mixture without adversely effecting the setting time contains about 70 to 74 wgt. % coarse and fine aggregates and about 5 to 8 wgt. % water and 8 to 17 wgt. % cement and 2 to 8 wgt. % ED (engineered dust) from a thermally treated mix of 50 wgt. % EAFD and 50 wgt. % precursor.

EXAMPLE 7

A still further embodiment of the invention relates to a concrete mixture consisting of Portland cement 70 wgt. %, about 30 wgt. % of EAFD and a precursor and wherein the precursor consists of about 65 wgt. % silica, about 15 wgt. % lime, about 3.5 wgt. % soda, about 10.5 wgt. % potash, about 4 wgt. % alumina and about 2 wgt. % magnesia and wherein EAFD and precursor are homogenized and heated in a kiln at about 1000° C. for about 30 minutes.

EXAMPLE 8

An even further embodiment of the invention will be described by a cementitious additive containing electric-arc furnace dust (EAFD) and a precursor as a replacement for up to 30% of the cement in concrete without adversely effecting the setting time of the concrete. The additive consists of about 50 wgt. % EAFD and about 50 wgt. % of precursor and wherein the precursor consists of 65 wgt. % silica, about 15 wgt. % lime, about 3.5 wgt. % soda, about 10.5 wgt. % potash, about 4 wgt. % alumina and about 2 wgt. % magnesia.

EXAMPLE 9

The concrete mixture in which the cement is replaced with 30 wgt. % ED (engineered dust) which is formulated from a thermally treated mix of 50 wgt. % EAFD and 50 wgt. % precursor where the precursor is homogenized and consists of about 65 wgt. % silica, about 15 wgt. % lime, about 3.5 wgt. % soda, about 10.5 wgt. % potash, about 4 wgt. % alumina and about 2 wgt. % magnesia.

EXAMPLE 10

The concrete mixture defined in Example 6 which includes about 70 wgt. % cement selected from the group consisting of ASTM Type I, Type II, Type V and mixtures thereof.

EXAMPLE 11

The concrete mixture defined in Example 9 in which the cement is Portland cement.

EXAMPLE 12

A concrete mixture consisting of up to about 70 wgt. % Portland cement, and between about 5 and 30 wgt. % of ED where it is formulated from a thermally treated mix of 50 wgt. % EAFD and 50 wgt. % precursor and wherein the precursor is selected from a group consisting of up to about 65 wgt. % silica, about 15 wgt. % lime, about 3.5 wgt. % soda, about 10.5 wgt. % potash, about 4 wgt. % alumina and about 2 wgt. % magnesia plus coarse and fine aggregate and water.

EXAMPLE 13

An additional embodiment of the invention includes a method for disposing of electric-arc furnace dust (EAFD) comprising the steps of forming a mixture of about 50 wgt. % electric-arc furnace dust (EAFD) and 50 wgt. % of a precursor and wherein the precursor contains at least about 55 wgt. % silica, about 10 to 20 wgt. % lime, about 2 to 5 wgt. % soda, about 5 to 15 wgt. % potash, about 2 to 6 wgt. % alumina and about 1 to 3 wgt. % magnesia; homogenizing said EAFD and the precursor by grinding one of the EAFD and the precursor having larger particles than the other until the EAFD and the precursor have about equal size particles; and feeding said homogenized EAFD and the precursor into a kiln at about 1000° C. and rotating for about 30 minutes to form a new insoluble phase of zinc and lead and adding about 5 wgt. % of the resulting mixture to about 16.5 wgt. % of cement and about 72 wgt. % of coarse and fine aggregate and 6.5 wgt. % water and mixing to form concrete.

EXAMPLE 14

The method for disposing of electric-arc furnace dust (EAFD) as defined in Example 13 in which the cement is selected from the group consisting of Portland cement, ASTM Type I, Type II, Type V and mixtures thereof.

EXAMPLE 15

A method for disposing of electric-arc furnace dust (EAFD) consisting of the steps of forming a mixture of about 50 wgt. % electric-arc furnace dust (EAFD) and 50 wgt. % of a precursor and wherein the precursor contains at least about 55 wgt. % silica, about 10 to 20 wgt. % lime, about 2 to 5 wgt. % soda, about 5 to 15 wgt. % potash, about 2 to 6 wgt. % alumina and about 1 to 3 wgt. % magnesia; homogenizing the EAFD and the precursor by grinding one of the EAFD and the precursor having larger particles than the other until the EAFD and the precursor have about equal size particles; and feeding the homogenized EAFD and the precursor into a kiln at about 1000° C. and rotating for about 30 minutes to form a new insoluble phase of zinc and lead and adding about 5 wgt. % of the resulting mixture to about 16.5 wgt. % of cement and about 72 wgt. % of coarse and fine aggregates and 6.5 wgt. % water and mixing to form concrete without adversely effecting the setting time.

EXAMPLE 16

A method for disposing of electric-arc furnace dust (EAFD) comprising the step of adding the material from Example 1 to a concrete mixture containing fine and coarse aggregate and water.

While the invention has been disclosed in connection with its preferred embodiments it should be recognized that changes and modifications may be made therein without departing from the scope of the claims.

What is claimed is:

1. A cementitious additive containing electric-arc furnace dust (EAFD) and a precursor as a replacement for up to 30 wgt. % of the cement in concrete, said cementitious additive comprising about 50 wgt. % EAFD and about 50 wgt. % of precursor and wherein said precursor contains about 55 wgt. % silica, at least about 10 to 20 wgt. % lime, about 2 to 5 wgt. % soda, about 5 to 15 wgt. % potash, about 2 to 6 wgt. % alumina and about 1 to 3 wgt. % magnesia; and
    wherein a homogenized mix of said EAFD and precursor is fed into an electric kiln at about 1000° C. and maintained therein for 25 to 35 minutes for re-crystallization to thereby form a new insoluble phase of zinc and other heavy elements that are chemically bonded.

2. The cementitious additive according to claim 1 in which said precursor consists of about 65 wgt. % silica, about 15 wgt. % lime, about 3.5 wgt. % soda, about 10.5 wgt. % potash, about 4 wgt. % alumina and about 2 wgt. % magnesia.

3. The method for replacing up to 30% of in a concrete mix without adversely effecting the setting time, said method comprising the following steps:
    reducing the particle size of a precursor to about the same particle size of an EAFD to thereby produce a homogenized mixture; the homogenized mixture comprising about 50 wgt % EAFD and about 50 wgt % precursor
    wherein said precursor consists of about 65 wgt % silica, about 15 wgt % lime, about 3.5 wgt % soda, about 10.5 wgt % potash, about 4 wgt % alumina, and about 2 wgt % magnesia;
    placing said homogenized mixture in an electric kiln at about 1000° C. for about 25 to 35 minutes for re-crystallization to form an insoluble phase of zinc and heavy metals; and
    replacing up to 30% of the cement in a concrete mix with said homogenized mixture after the heating in the kiln step.

4. The method for replacing up to 30% of cement in a concrete mix without adversely effecting the setting time, said method consisting of the following steps:
    reducing the particle size of a precursor to about the same particle size of an EAFD to produce a homogenized mix; the homogenized mixture comprising about 50 wgt % EAFD and about 50 wgt % precursor
    wherein said precursor consists of about 65 wgt % silica, about 15 wgt % lime, about 3.5 wgt % soda, about 10.5 wgt % potash, about 4 wgt % alumina, and about 2 wgt % magnesia;
    placing said homogenized mixture in an electric kiln at about 1000° C. for about 25 to 35 minutes for re-crystallization to form an insoluble phase of zinc and heavy metals; and
    replacing up to 30% of the cement in a concrete mix with said homogenized mix after the heating in the kiln step.

5. A method for replacing up to 30% of the cement in a concrete mix without adversely effecting the setting time according to claim 4, in which the step of homogenizing said EAFD and said precursor comprises grinding one of said EAFD and said precursor with a larger particle size to approximately the particle size of the other of the EAFD and precursor.

6. A method for replacing up to 30% of the cement in a concrete mix without adversely effecting the setting time according to claim 5, which contains 70 to 74 wgt. % aggregate and about 5 to 8 wgt. % water and 8 to 17 wgt. % Portland cement and 2 to 8 wgt. % ED.

7. A cementitious additive containing electric-arc furnace dust (EAFD) and a precursor as a replacement for up to 30% of the cement in concrete without adversely affecting the setting time of the concrete, said additive consisting of:
    about 50 wgt. % EAFD and about 50 wgt. % of precursor and wherein said precursor consists of 65 wgt. % silica, about 15 wgt. % lime, about 3.5 wgt. % soda, about 10.5 wgt. % potash, about 4 wgt. % alumina and about 2 wgt. % magnesia.

8. A method for disposing of electric-arc furnace dust (EAFD) comprising the steps of forming a mixture of about 50 wgt. % electric-arc furnace dust (EAFD) and 50 wgt. % of a precursor and wherein said precursor contains at least about 55 wgt. % silica, about 10 to 20 wgt. % lime, about 2 to 5 wgt. % soda, about 5 to 15 wgt. % potash, about 2 to 6 wgt. % alumina and about 1 to 3 wgt. % magnesia;
    homogenizing said EAFD and said precursor by grinding one of said EAFD and said precursor having larger particles than the other until said EAFD and said precursor have about equal size particles; and
    feeding said homogenized EAFD and said precursor into a kiln at about 1000° C. and rotating for about 30 minutes to form a new insoluble phase of zinc and lead and adding about 5 wgt. % of the resulting mixture to about 16.5 wgt. % of cement and about 72 wgt.% of coarse and fine aggregates and 6.5 wgt. % water and mixing to form concrete without adversely effecting the setting time.

9. A method for disposing of electric-arc furnace dust (EAFD) according to claim 8, in which said cement is selected from the group consisting of Portland cement, ASTM Type I, Type II, Type V and mixtures thereof.

10. A method for disposing of electric-arc furnace dust (EAFD) consisting of the steps of forming a mixture of about 50 wgt. % electric-arc furnace dust (EAFD) and 50 wgt. % of a precursor and wherein said precursor contains about 55 wgt. % silica, about 10 to 20 wgt. % lime, about 2 to 5 wgt. % soda, about 5 to 15 wgt. % potash, about 2 to 6 wgt. % alumina and about 1 to 3 wgt. % magnesia;

homogenizing said EAFD and said precursor by grinding one of said EAFD and said precursor having larger particles than the other until said EAFD and said precursor have about equal size particles; and feeding said homogenized EAFD and said precursor into a kiln at about 1000° C. and rotating for about 30 minutes to form a new insoluble phase of zinc and lead and adding about 5 wgt. % of the resulting mixture to about 16.5 wgt. % of cement and about 72 wgt. % of coarse and fine aggregates and 6.5 wgt. % water and mixing to form concrete without adversely effecting the setting time.

11. A method for disposing of electric-arc furnace dust (EAFD) comprising the step of adding the material from claim 1 to a concrete mixture containing fine and coarse aggregate and water.

* * * * *